United States Patent [19]

Gutierrez et al.

[11] Patent Number: 4,866,139

[45] Date of Patent: * Sep. 12, 1989

[54] LACTONE MODIFIED, ESTERIFIED DISPERSANT ADDITIVES USEFUL IN OLEAGINOUS COMPOSITIONS

[75] Inventors: Antonio Gutierrez, Mercerville; Robert D. Lundberg, Bridgewater, both of N.J.

[73] Assignee: Exxon Chemical Patents Inc., Linden, N.J.

[*] Notice: The portion of the term of this patent subsequent to Sep. 12, 2006 has been disclaimed.

[21] Appl. No.: 916,114

[22] Filed: Oct. 7, 1986

[51] Int. Cl.$^4$ ............................................. C08F 10/00

[52] U.S. Cl. ..................................... 525/333.7; 44/63; 44/66; 44/68; 44/70; 44/71; 252/51; 252/51.5 A; 252/56 R; 252/56 D; 252/49.6; 252/35; 548/237; 548/238; 549/267; 560/196; 560/198; 525/331.7

[58] Field of Search .......................... 525/331.7, 333.7; 548/237, 238; 549/267; 560/196, 198

[56] References Cited

U.S. PATENT DOCUMENTS

| | | |
|---|---|---|
| Re. 26,330 | 1/1968 | Colfer . |
| 2,767,144 | 10/1956 | Gottshall et al. . |
| 2,890,208 | 6/1959 | Young et al. . |
| 3,087,936 | 4/1963 | LeSuer . |
| 3,131,150 | 4/1964 | Stuart et al. . |
| 3,154,560 | 10/1964 | Kirkwood . |
| 3,169,945 | 2/1965 | Hostettler et al. . |
| 3,172,892 | 3/1965 | LeSuer et al. . |
| 3,198,736 | 8/1965 | Henderson . |
| 3,202,678 | 8/1965 | Stuart et al. . |
| 3,215,707 | 11/1965 | Rease et al. . |
| 3,219,666 | 11/1965 | Norman et al. . |
| 3,231,587 | 11/1966 | Rease et al. . |
| 3,269,946 | 8/1966 | Wiese . |
| 3,272,743 | 9/1966 | LeSuer . |
| 3,272,746 | 9/1966 | LeSuer . |
| 3,278,550 | 10/1966 | LeSuer et al. . |
| 3,284,409 | 11/1966 | Dorer . |
| 3,284,417 | 11/1966 | Hostettler et al. . |
| 3,288,714 | 11/1966 | Osuch . |
| 3,325,484 | 6/1967 | Deghenghi et al. . |
| 3,361,673 | 1/1968 | Stuart et al. . |
| 3,367,895 | 2/1968 | Clark . |
| 3,379,693 | 4/1968 | Hostettler et al. . |
| 3,381,022 | 4/1968 | LeSuer . |
| 3,390,086 | 6/1963 | O'Halloran . |
| 3,401,118 | 9/1968 | Benoit et al. . |
| 3,403,102 | 9/1968 | LeSuer . |
| 3,455,827 | 7/1969 | Mehmedbasich et al. . |
| 3,522,179 | 7/1970 | LeSuer . |
| 3,562,159 | 2/1971 | Mastin . |
| 3,576,743 | 4/1971 | Widmer et al. . |
| 3,632,510 | 1/1972 | LeSuer . |
| 3,684,771 | 8/1972 | Braun . |
| 3,708,522 | 1/1973 | LeSuer . |
| 3,792,061 | 2/1974 | Zecher et al. . |
| 3,799,877 | 3/1974 | Nnadi et al. . |
| 3,836,470 | 9/1974 | Miller . |
| 3,836,471 | 9/1974 | Miller . |
| 3,838,050 | 9/1974 | Miller . |
| 3,838,052 | 9/1974 | Miller . |
| 3,879,308 | 4/1975 | Miller . |
| 3,912,764 | 10/1975 | Palmer . |
| 3,927,041 | 12/1975 | Cengle et al. . |
| 3,950,341 | 4/1976 | Okamoto et al. . |
| 4,017,406 | 4/1977 | Brois et al. . |
| 4,062,786 | 12/1977 | Brois et al. . |
| 4,102,798 | 7/1978 | Ryer et al. . |
| 4,110,349 | 9/1978 | Buckler . |
| 4,113,639 | 9/1978 | Lonstrup et al. . |
| 4,116,875 | 9/1978 | Nnadi et al. . |
| 4,116,876 | 9/1978 | Brois et al. . |
| 4,123,373 | 10/1978 | Brois et al. . |
| 4,151,173 | 3/1979 | Vogel . |
| 4,169,836 | 10/1979 | Ryer et al. . |
| 4,176,073 | 11/1979 | Ryer et al. . |
| 4,234,435 | 11/1980 | Meinhardt et al. . |
| 4,263,153 | 4/1981 | Davis et al. . |
| 4,292,184 | 9/1981 | Brois et al. . |
| 4,362,635 | 12/1982 | Dhein et al. . |
| 4,379,914 | 4/1983 | Lundberg . |
| 4,388,471 | 6/1983 | Wollenberg . |
| 4,450,281 | 5/1984 | Wollenberg . |
| 4,463,168 | 7/1984 | Lundberg . |
| 4,486,326 | 12/1984 | Guitierrez et al. . |
| 4,502,970 | 3/1985 | Schetelich et al. . |
| 4,517,104 | 5/1985 | Bloch et al. . |
| 4,532,058 | 7/1985 | Chafetz . |
| 4,536,547 | 8/1985 | Lundberg et al. . |
| 4,584,117 | 4/1986 | Wollenberg . |
| 4,585,566 | 4/1986 | Wollenberg . |
| 4,612,132 | 9/1986 | Wollenberg . |
| 4,614,603 | 9/1986 | Wollenberg . |
| 4,617,138 | 10/1986 | Wollenberg . |
| 4,624,681 | 11/1986 | Wollenberg . |
| 4,645,515 | 2/1987 | Wollenberg . |
| 4,647,390 | 3/1987 | Buckley, III et al. . |
| 4,663,062 | 5/1987 | Wollenberg . |
| 4,664,460 | 5/1987 | Wollenberg . |
| 4,666,459 | 5/1987 | Wollenberg . |
| 4,668,246 | 5/1987 | Wollenberg . |
| 4,680,129 | 7/1987 | Plavac .......................... 252/51.5 A |
| 4,741,848 | 5/1988 | Koch . |

FOREIGN PATENT DOCUMENTS

| | | |
|---|---|---|
| 612320 | 1/1961 | Canada . |
| 202024 | 11/1986 | European Pat. Off. . |
| 1054370 | 1/1967 | United Kingdom . |

Primary Examiner—Edward J. Smith
Attorney, Agent, or Firm—R. A. Maggio; J. B. Murray, Jr.

[57] ABSTRACT

Poly($C_5$–$C_9$ lactone) adducts are made by reacting a $C_5$–$C_9$ lactone with a post reacted hydrocarbyl substituted $C_4$–$C_{10}$ monounsaturated dicarboxylic acid producing material, e.g., a polyisobutenyl succinic anhydride, which, in turn, preferably was made by reacting a polymer of a $C_2$ to $C_{10}$ monoolefin, preferably polyisobutylene, having a number average molecular weight of about 700 to 5,000, with a $C_4$ to $C_{10}$ monounsaturated acid, anhydride or ester, preferably maleic anhydride, such that there are 0.7 to 2.0 dicarboxylic acid producing moieties per molecular of said olefin polymer used in the reaction mixture, and then, post reacting the substituted acid, anhydride or ester with a polyol such as pentaerythritol or THAM. The resulting adducts are useful per se as oil soluble dispersant additives useful in fuel and lubricating compositions including concentrates containing the additives.

44 Claims, No Drawings

LACTONE MODIFIED, ESTERIFIED DISPERSANT ADDITIVES USEFUL IN OLEAGINOUS COMPOSITIONS

RELATED U.S. APPLICATIONS

This application is related to the following applications filed by the inventors herein: Ser. No. 916,218, Ser. No. 916,113, Ser. No. 916,287, Ser. No. 916,108, Ser. No. 916,303 and Ser. No. 916,217. All of the above applications were filed on even date herewith. All of these related applications are expressly incorporated herein by reference in their entirety.

BACKGROUND OF THE INVENTION

1. FIELD OF THE INVENTION

This invention relates to oil soluble dispersant additives useful in fuel and lubricating oil compositions, including concentrates containing said additives, and methods for their manufacture and use. The dispersant additives are poly ($C_5$–$C_9$ lactone) adducts of amine neutralized dicarboxylic acids, anhydrides, esters, etc., which have been substituted with a high molecular weight hydrocarbon group and then reacted with a polyol or certain amino alcohols, and then with the $C_5$–$C_9$ lactone. The high molecular weight hydrocarbon group has a number average molecular weight ($M_n$) of about 300 to about 10000. The additives will have a ratio (functionality of about 0.70 to about 2.0 dicarboxylic acid producing moieties for each equivalent weight of the high molecular weight hydrocarbon therein.

2. PRIOR ART

Polyalkylene substituted $C_4$–$C_{10}$ dicarboxylic acid and anhydride adducts with polyols and polyamines are well known lubricating additives. These agents act to keep sludge and varnish dispersed in engine oils and have been very successful commercially.

It is also known that polymers of 6 to 10 membered lactones such as valerolactone or E-caprolactone can be prepared by reacting the lactone monomer with a hydoxyl or amine initiator. When reacting E-caprolactone, for example, the polymerization reaction may be illustrated by the following equations:

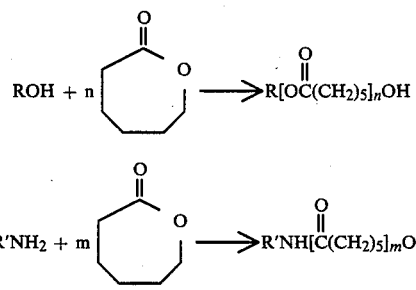

Eq. 1

Eq. 2

The reactions are known to be catalyzed by various esterification catalysts such as stannous octanoate, and a variety of different molecular weight products are feasible depending upon the ratio of lactone to initiator. Molecular weights on the order of from a few hundred up to about 5,000 are reproducably achievable.

Caprolactone can also be polymerized to a very high molecular weight, e.g., on the order of 100,000 or more. Typically such high molecular weight polymers do not employ initiators and preservation of functionality is not a requirement.

It is also known to react a lactone such as E-caprolactone with a polyol to form polyesters having terminal hydroxyl groups which are useful as plasticizers.

It has now been found that improved oil soluble dispersant additives, useful in fuel and lubricating oil compositions, including concentrates containing the additives, can be prepared by polymerizing a 6 to 10 membered lactone using as the initiator those lactone reactive hydroxyl functions contained within a known class of oil soluble dispersants, namely: dicarboxylic acids, anhydrides, esters, etc. that have been substituted with a high molecular weight hydrocarbon group and esterified with a polyol. A typical example of one such initiator is a polyalkylene succinic anhydridepentaerythritol adduct wherein the polyalkylene moiety has a number average molecular weight of about 300 to about 10,000 and wherein the ratio (functionality) of succinic acid producing moieties to each equivalent weight of the polyalkylene moiety is from about 0.70 to about 2.0.

While there are a number of prior art disclosures relating to esterfied polyalkenyl succinic acid or anhydride type dispersants, and to lactone polymerization reactions, in general, little or no prior art of direct pertinence appears to have surfaced in regard to the present dispersants. Exemplary of the patent literature which relates to lactone polymerization processes and/or to oil soluble dispersant additives are the following U.S. Patents: U.S. Pat. No. 4,362,635 discloses synthetic ester oils which are esterification products of monoalcohols and dicarboxylic acids or of polyhydric alcohols and monocarboxylic acids respectively, containing 5 to 45% by weight of units of hydroxycarboxylic acids obtained from aliphatic alcohols, aliphatic, cycloaliphatic or aromatic carboxylic acids, and lactones of aliphatic $C_5$–$C_{12}$ hydrocarboxylic acids. The synthetic ester oils are suitable for the preparation of lubricants and lubricant compositions.

U.S. Pat. No. 2,890,208 discloses a process for polymerizing lactones to form lactone polyesters that are useful as plasticizers.

U.S. Pat. No. 3,950,341 relates to oil soluble detergent dispersants which are prepared by reacting a polyalkenyl succinic acid or its anhydride with a hindered alcohol such as pentaerythritol, and then with an amine.

U.S. Pat. No. 3,708,522 relates to lubricating oil additives which are oil soluble, mono- or polycarboxylic acid esters which are post-treated with mono-or polycarboxylic acylating agents. Esters of polyisobutenyl-substitued succinic anhydride and pentaerythritol post-treated with maleic anhdride exemplify the process and compositions disclosed in this patent.

U.S. Pat. No. 4,062,786 and its continuation-in-part (U.S. Pat. No. 4,292,184) disclose lactone oxazoline reaction products of hydrocarbon substituted lactone carboxylic acids such as polybutyl lactone carboxylic acid, with a 2,2-disubstituted-2-amino-1-alkanol such as tris-(hydroxymethyl)-amino-methane (THAM). The reaction products and their derivatives are disclosed as being useful additives in oleaginous compositions such as sludge dispersants for lubricating oil.

U.S. Pat. No. 4,169,836 discloses reacting hydrocarbon substituted dicarboxylic acids, esters, or anhydrides, for example, octadecenylsuccinic anhydride and polyisobutenyl succinic anhydride with 2,2-disubstituted-2-amino-1-alkanols, for example, THAM, to form oxazoline products which are useful as additives in oleaginous compositions, such as sludge dispersants for lubricating oil.

U.S. Pat. No. 4,017,406 discloses carboxylate half esters of 1-aza-3,7-dioxabicyclo [3.3.0] oct-5-yl methyl alcohol which are the reaction products of long chain dicarboxylic anhydrides, such as polyisobutenyl succinic anhydride, and aldehyde/THAM adducts. The esters are useful as lubricating oil additives, friction modifiers and the like, depending upon the molecular weight. The disclosure of this patent is expressly incorporated herein by reference.

U.S. Pat. No. 4,102,798 relates to oil soluble oxazoline reation products of polyisobutenyl succinic anhydride and THAM which are useful additives in oleaginous compositions, such as sludge dispersants for lubricating oil or gasoline.

U.S. Pat. Nos. 4,113,639 and 4,116,876 disclose an example of alkenyl succinic anhydride having a molecular weight of the alkenyl group of 1,300 and a Saponification Number of 103 (about 1.3 succinic anhydride units per hydrocarbon moledule). This alkenyl succinic anhydride may be reacted with polyamine and then boric acid (U.S. Pat. No. 4,113,639), or may be reacted with an amino alcohol to form an oxazoline (4,116,876) which is then borated by reaction with boric acid.

U.S. Pat. No. 3,219,666 discloses as dispersing agents in lubricants, derivatives of polyalkenyl succinic acids and nitrogen compounds, including polyamines. The preferred molecular weight of the polyalkenyl moieties is 750–5,000.

U.S. Pat. No. 4,234,435 discloses as oil additives, polyalkylene substituted dicarboxylic acids derived from polyalkylenes having a $M_n$ of 1300 to 5,000 and containing at least 1.3 dicarboxylic acid groups per polyalkylene. In Example 34 of that patent, a polyisobutene-substituted succinic acylating agent is reacted with caprolactam in the presence of mineral oil and sodium hydroxide.

U.S. Pat. No. 3,381,022 relates to ester derivatives of substantially saturated polymerized olefin-substituted succinic acid wherein the polymerized olefin substituent contains at least about 50 aliphatic carbon atoms and has a molecular weight of about 700 to 5,000. The esters include the acidic esters, diesters, and metal salt esters wherein the ester moiety is derived from monohydric and polyhydric alcohols, phenols and naphthols. The ester derivatives are useful as additives in lubricating compositions, fuels, hydrocarbon oils and power transmission fluids. A related application, i.e., U.S. Pat. No. 3,522,179, relates to lubricating compositions comprising a major amount of a lubricating oil and a minor proportion of an ester derivative of a hydrocarbon-substituted succinic acid sufficient to improve the detergency of the lubricating composition. The ester derivatives are similar to those described in U.S. Pat. No. 3,381,022 and contain at least about 50 aliphatic carbon atoms. The hydrocarbon substituent may be derived from a polymerized lower monoolefin having a molecular weight of from about 700 to about 5,000.

U.S. Pat. No. 4,502,970 discloses lubricating oil compositions useful in both gasoline engines and diesel engines. The compositions contain a polyisobutenyl succinicimide as a supplemental dispersant-detergent in combination with another conventional dispersant. The polyisobutenyl group has a $M_n$ of about 700–5,000.

U.S. Pat. No. 4,379,914 and its continuation-in-part (U.S. Pat. No. 4,463,168) disclose the preparation of polycaprolactone polymers by reacting E-caprolactone with a diamine wherein one of the amine groups of the diamine is a tertiary amine and the other is a primary or secondary amine. The polycaprolactone polymers are disclosed as being useful for neutralizing certain sulfonic acid-containing polymers to form amine-neutralized, sulfonated derivatives which can be combined with an alkyl benzene sulfonic acid to give a surfactant which contains ester groups, hydroxyl groups and amine-neutralized sulfonate groups.

U.S. Pat. No. 3.169,945 discloses the preparation of lactone polyesters which are useful as plasticizers and as intermediates for preparing elastomers and foams. The polyesters can be prepared by reacting a lactone such a E-caprolactone with an initiator such as an alcohol, amine or amino alcohol.

All of the above discussed patents are expressly incorporated herein by reference in their entirety.

Additional exemplary prior art disclosures, which are expressly incorporated herein by reference in their entirety are U.S. Pat. Nos. 2,767,144; 3,087,936; 3,131,150; 3,154,560; 3,172,892; 3,198,736; 3,202,678; 3,215,707; 3,231,587; 3,325,484; 3,269,946; 3,272,743; 3,272,746; 3,278,550; 3,284,409; 3,284,417; 3,288,714; 3,361,673; 3,367,895; 3,379,693; 3,390,086; 3,401,118; 3,403,102; 3,455,827; 3,562,159; 3,576,743; 3,632,510; 3,684,771; 3,792,061; 3,799,877; 3,836,470; 3,836,471; 3,838,050; 3,838,052; 3,879,308; 3,912,764; 3,927,041; 4,110,349; 4,116,875; 4,123,373; 4,151,173; 4,167,073; 4,263,153; 4,486,326; 4,517,104; 4,532,058; 4,536,547 and Reissue 26,330.

SUMMARY OF THE INVENTION

Despite the efficacy of prior art dispersant and oleaginous compositions, there is a need for more efficient and less costly dispersants which can either perform better, or perform well at lower dispersant levels. Accordingly, it is a principal object of this invention to provide novel polyol based dispersants which are effective, and readily prepared under typical dispersant manufacturing conditions.

Another object is to provide a novel class of poly ($C_5$–$C_9$ lactone) adduct dispersants.

Another object is to provide a process for preparing efficient dispersants from $C_5$–$C_9$ lactones and hydrocarbyl substituted dicarboxylic acids, anhydrides, etc. which contain lactone-reactive hydroxyl functionality.

A further object is to provide lubricant compositions and concentrates containing the novel ($C_5$–$C_9$ lactone) of this invention.

Yet another object is to provide a novel class of oil soluble dispersants from polyalkylene substituted acylating agents which have at least one lactone-reactive hydroxyl group in their structure.

Still another object is to provide poly ($C_5$–$C_9$ lactone) adducts of polyalkylene substituted succinic acylating agents which have been esterfied with a polyol, as well as lubricant compositions and concentrates containing the adducts.

Yet another object is to provide ($C_5$–$C_9$ lactone) of polyalkylene substituted succinic acylating agents which have been reacted with amino alcohols to form an oxazoline prior to being reacted with a $C_5$–$C_9$ lactone, as well as lubricant compositions and concentrates containing the adducts.

Still another object is to provide $C_5$–$C_9$ lactone-amino alcohol adducts which have been post-reacted with polyalkylene substituted succinic acylating agents, as well as lubricant compositions and concentrates containing the post-reacted adducts.

Still another object is to provide metal complexes and post-treated derivatives, e.g., borated derivatives, of the $C_5$–$C_9$ lactone derived dispersants of this invention, as well as lubricant compositions and concentrates containing such post-treated derivatives.

The manner in which these and other objects can be achieved will be apparent from the detailed description of the invention which appears hereinbelow.

In one aspect of this invention, one or more of the above objects can be achieved by initiating the polymerization of a $C_5$–$C_9$ lactone by means of a hydroxyl group contained in a polyolefin substituted dicarboxylic acylating agent, wherein the polyolefin has a number average molecular weight of about 300 to about 10,000, and wherein the acylating agent has been esterified with a polyfunctional alcohol and wherein the polyolefin substituted, esterified acylating agent contains from about 0.70 to about 2.0 dicarboxylic acid producing moieties, preferably acid anhydride moieties, per equivalent weight of polyolefin.

In another aspect, one or more of the objects of this invention can be achieved by heating a $C_5$–$C_9$ lactone such as E-caprolactone at a temperature of at least about 80° C., and preferably from about 90° C. to about 180° C. with an ester of polyalkylene succinic acid or anhydride wherein the polyalkylene is characterized by a number average molecular weight of about 700–5,000 and wherein the ester is characterized by the presence within its struction of from about 0.7 to about 2.0 succinic acid or succinic acid derivative moieties for each equivalent weight of polyalkylene; and, in a further aspect, one or more objects of this invention are achieved by providing poly ($C_5$–$C_9$ lactone) adducts produced by such a process.

One or more additional objects of this invention are achieved by reacting E-caprolactone with a polyalkylene succinic acylating agent which has been post treated to introduce into the structure thereof at least one lactone-reactive hydroxyl group; one or more additional objects are accomplished by providing poly (E-caprolactone) adducts produced by such a process.

One or more objects of this invention can be illustrated in connection with the reaction between E-caprolactone and a polyester formed by reacting a polyol such as pentaerythritol with polyisobutenyl succinic anhydride. This process can be characterized by the following general equation:

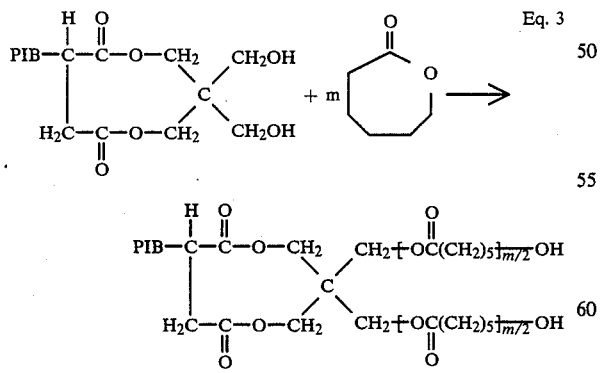

Eq. 3 where PIB represents polyisobutylene having a number average molecular weight ($M_n$) of from about 300 to about 10,000.

Still other objects can be illustrated in connection with the reaction between E-caprolactone and an oxazoline dispersant such as that formed by the reaction between polyisobutenyl succinic anhydride and a polyfunctional amino alcohol such as tris-(hydroxymethyl)-aminomethane (THAM). This process can be characterized by the following general reaction scheme:

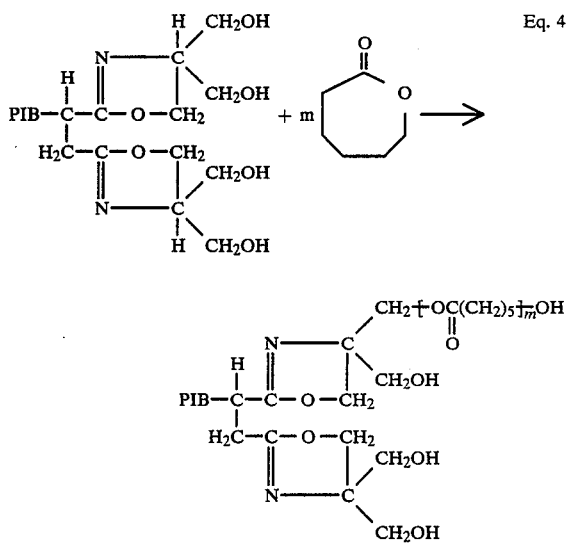

Eq. 4 where PIB represents polyisobutylene of 300 to about 10,000 $M_n$, and m has an average value of from about 0.2 to about 100.

One or more objects can be illustrated in connection with the reaction between E-caprolactone and a lactone oxazoline such as that formed by the acid catalyzed lactonization of polyisobutenyl succinic anhydride, followed by reaction with THAM. This process can be characterized by the following general reaction schemes:

Eq. 5

-continued

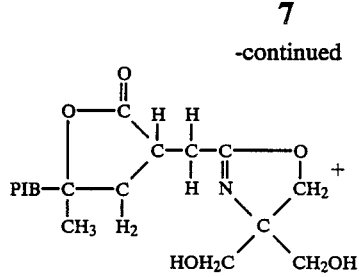
Eq. 6

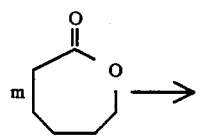

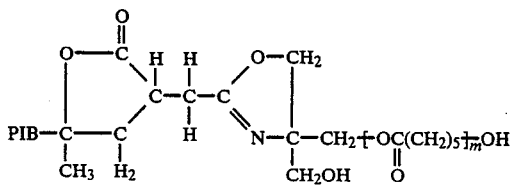

The novel poly (C$_5$–C$_9$ lactone) adducts of this invention are useful per se as an additive, e.g., a dispersant additive, in the same manner as disclosed in U.S. Pat. No. 3,219,666 where prior art derivatives of polyalkenyl succinic acids and nitrogen compounds are used as dispersant/detergents in lubricants, especially lubricants intended for use in the crankcase of internal combustion engines, gears, and power transmitting units. Accordingly, one or more objects of this invention are achieved by providing lubricating oil compositions, e.g., automatic transmission fluids, heavy duty oils suitable for use in the crankcases of gasoline and diesel engines, etc. containing the novel (C$_5$–C$_9$ lactone) adducts of this invention. Such lubricating oil compositions may contain additional additives such as viscosity index improvers, antioxidants, corrosion inhibitors, detergents, pour depressants, antiwear agents, etc.

Still further objects are achieved by providing concentrate compositions comprising from about 20 to about 80 weight % of a normally liquid, substantially inert, organic solvent/diluent, e.g., mineral lubricating oil, or other suitable solvent/diluent and from about 20 to about 80 weight % of a (C$_5$–C$_9$ lactone) adduct, as mentioned above and described in more detail hereinafter.

DESCRIPTION OF THE PREFERRED EMBODIMENTS THE HYDROCARBYL DICARBOXYLIC ACID MATERIAL

The long chain hydrocarbyl substituted dicarboxylic acid material, i.e., acid or anhydride, or ester, used in the invention includes long chain hydrocarbon, generally a polyolefin, substituted with 0.70 to 2.0, preferably 0.9 to 1.6, e.g., 1.05 to 1.35 moles, per mole of polyolefin of an alpha or beta unsaturated C$_4$–C$_{10}$ dicarboxylic acid or anhydride or ester thereof, such as fumaric acid, itaconic acid, maleic acid, maleic anhydride, choloromaleic acid, dimethyl fumarate, chloromaleic anhydride, etc.

Preferred olefin polymers for reaction with the unsaturated dicarboxylic acids are polymers comprising a major molar amount of C$_2$ to C$_{10}$, e.g., C$_2$ to C$_5$ monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a C$_4$ to C$_{18}$ diolefin, e.g., a copolymer of isobutylene and butadiene; or a copolymer of ethylene, propylene and 1,4-hexadiene; etc.

In some cases, the olefin polymer may be completely saturated, for example an ethylenepropylene copolymer made by a Ziegler-Natta synthesis using hydrogen as a moderator to control molecular weight.

The olefin polymers will usually have number average molecular weights within the range of about 300 and about 10,000 more usually between 700 and about 5,000 and preferably between about 700 and about 3000. Particularly useful olefin polymers have number average molecular weights within the range of about 900 and about 2,500 with approximately one terminal double bond per polymer chain. An especially useful starting material for a highly potent dispersant additive made in accordance with this invention is polyisobutylene. The number average molecular weight for such polymers can be determined by several known techniques. A convenient method for such determination is by gel permeation chromatograhpy (GPC) which additionally provides molecular weight distribution information, see W. W. Yau, J. J. Kirkland and D. D. Bly, "Modern Size Exclusion Liquid Chromatography", John Wiley and Sons, New York, 1979.

Processes for reacting the olefin polymer with the C$_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 wt. % chlorine, or bromine, based on the weight of polymer, by passing the chlorine or bromine through the polyolefin at a temperature of 100° to 250° C., e.g., 140° to 225° C., for about 0.5 to 10, preferably 1 to 7 hours. The halogenated polymer then may be reacted with sufficient unsaturated acid or anhydride at 100° to 250° C., usually about 140° to 180° C., for about 0.5 to 10, e.g., 3 to 8 hours, so the product obtained will contain about 0.9 to 1.6 preferably 1.06 to 1.20, e.g., 1.10 moles of the unsaturated acid per mole of the halogentated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 wt. % of the polyolefin, e.g., polyisobutylene will normally react with the dicarboxylic acid material. Upon carrying out a thermal reaction without the use of halogen or a catalyst, then usually only about 50 to 75 wt. % of the polyisobutylene will react. Chlorination helps increase the reactivity. For convenience, the aforesaid functionality ratios of dicarboxylic acid producing units to polyolefin of 0.7 to 2.0 based upon the total amount of polyolefin, that is, the total of both reacted and unreacted polyolefin, used to make the product.

ESTERIFICATION OF THE HYDROCARBYL DICARBOXYLIC ACID MATERIAL

In order to form the poly ($C_5$–$C_9$ lactone) adduct dispersants of the present invention, the hydrocarbyl dicarboxylic material first must be reacted with a polyfunctional alcohol or, in the alternative, must be reacted with a polyfunctional amino alcohol to form a bis-oxazoline intermediate or a lactone oxazoline intermediate.

Regardless of whether the hydrocarbyl carboxylic material is esterfied with a polyol, or reacted with an amino alcohol to form a bis-oxazoline or lactone oxazoline, the resulting intermediate will contain one or more terminal hydroxyl groups which can initiate a subsequent lactone polymerization to provide the novel dispersants of this invention.

Useful polyol compounds for the esterification of the hydrocarbyl substituted dicarboxylic acid material include aliphatic polyhydric alcohols containing up to about 100 carbon atoms preferably up to about 50 carbon atoms, and more preferably up to about 20 carbon atoms and about 2 to about 15 hydroxyl groups, preferably from about 2 to about 10, and most preferably from 2 to about 8 hydroxyl groups. These alcohols can be quite diverse in structure and chemical composition, for example, they can be substituted or unsubstituted, hindered or unhindered, branched chain or straight chain, etc., as desired. Typical alcohols are alkylene glycols such as ethylene glycol, propylene glycol, trimethylene glycol, butylene glycol, and polyglycol such as diethylene glycol, triethylene glycol, tetraethylene glycol, dipropylene glycol, tripropylene glycol, dibutylene glycol, tributylene glycol, and other alkylene glycols and polyalkylene glycols in which the alkylene radical contains from two to about eight carbon atoms. Other useful polyhydric alcohols include glycerol, monomethyl ether of glycerol, pentaerythritol, dipentaerythritol, tripentaerythritol, 9,10-dihydroxystearic acid, the ethyl ester of 9,10-dihydroxystearic acid, 3-chloro-1,2-propanediol, 1,2-butanediol, 1,4-butanediol, 2,3-hexanediol, 2,3-hexanediol, pinacol, tetrahydroxy pentane, erythritol, arabitol, sorbitol, mannitol, 1,2-cyclohexanediol, 1,4-cyclohexandiol, 1,4-(2-hydroxyethyl)cyclohexane, 1,4-dihydroxy-2-nitrobutane, 1,4-di(2-hydroxyethyl)-benzene, the carbohydrates such as glucose, ramnose, mannose, glyceraldehyde, and galactose, and the like, amino alcohols such as di-(2-hydroxyethyl)amine, tri-(3-hydroxypropyl)amine, N,N'-di(hydroxyethyl)ethylenediamine, copolymer of allyl alcohol and styrene, N,N-di-(2-hydroxylethyl) glycine and esters thereof with lower mono- and polyhydric aliphatic alcohols, etc.

Included within the group of aliphatic alcohols are those alkane polyols which contain ether groups such as polyethylene oxide repeating units, as well as those polyhydric alcohols containing at least three hydroxyl groups, at least one of which as been esterified with a mono-carboxylic acid having from eight to about 30 carbon atoms such as octanoic acid, oleic acid, stearic acid, linoleic acid, dodecanoic acid, or tall oil acid. Examples of such partially esterified polyhydric alcohols are the mono-oloeate of sorbitiol, the monooleate of glycerol, the mono-stearate of glycerol, the di-stearate of sorbitol, and the di-dodecanoate of erythritol.

A preferred class of esters are those prepared from aliphatic alcohols containing from 2 to about 20 carbon atoms, and especially those containing three to 15 carbon atoms. This class of alcohols includes glycerol, erythritol, pentaerythritoal, dipentaerithritol, tripentaerythritol, gluconic acid, glyceraldehyde, glucose, arabinose, 1,7-heptanediol, 2,4-heptanediol, 1,2,3-hexanetriol, 1,2,4-hexanetriol, 1,2,5-hexanetriol, 2,3,4-hexanetriol, 1,2,3-butanetriol, 1,2,4-butanetriol, quinic acid, 2,2,6,6-tetrakis (hydroxymethyl)-cyclohexanol, 1,10-decanediol, digitalose, and the like. The esters prepared from aliphatic alcohols containing at least three hydroxyl groups and up to fifteen carbon atoms are particularly preferred.

An especially preferred class of polyhydric alcohols for preparing the esters used as starting materials in the present invention are the polyhydric alkanols containing three to 15, especially three to six carbon atoms and having at least three hydroxyl groups. Such alcohols are exemplified in the above specifically identified alcohols and are represent by 1,2,4-hexanetriol, and tetrahydroxy pentane and the like.

The polyol is readily reacted with the hydrocarbyl substituted dicarboxylic acid material, e.g., alkenyl succinic anhydride, by heating an oil solution containing 5 to 95 wt. % of dicarboxylic acid material to about 100° to 250° C., preferably 100° to 210° C., generally for 1 to 10, e.g., 2 to 6 hours until the desired amount of water is removed. Reaction ratios can vary considerably, depending upon the reactants, amount of excess polyol, type of bonds formed, etc. Generally from 1 to 2, preferably about 1 to 1.2, e.g., to 1.0 mole of polyol, e.g., pentaerythritol is used, per mole of the dicarboxylic acid moiety content e.g., grafted maleic anhydride content. Variations beyond theses ratios can be practiced but are not normally, desireable. For example, if one mole of olefin were reacted with sufficient maleic anhydride to add 1.0 mole of maleic anhydride groups per mole of olefin then about 1.0 moles of polyol preferably would be used to convert olefin succinic anhydride to an ester; i.e., about 1.0 mole of polyol per mole of dicarboxylic acid moiety would be used.

The reaction between the polyol and the hydrocarbyl substituted dicarboxylic acid material may be exemplified by the following reaction scheme which represents the esterification of polyisobutenyl succinic anhydride with pentaerythritol:

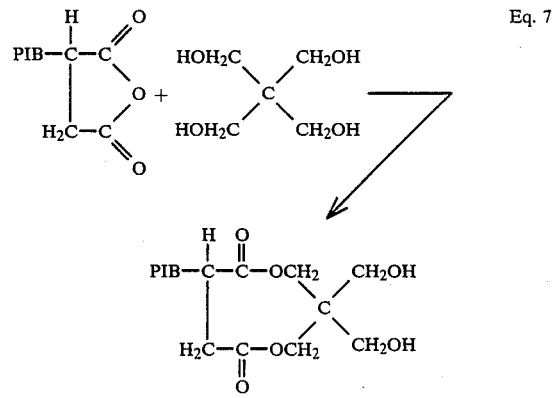

Eq. 7 where PIB is polyisobutylene.

In an alternative embodiment, an amino alcohol is reacted with the hydrocarbyl substituted dicarboxylic acid material to form either a bis-oxazoline intermediate or a lactone oxazoline intermediate, depending upon the reaction conditions.

Useful amino alcohol compounds include 2,2-disubstituted-2-amino-1-alkanols having from two to three hydroxyl groups and containing a total of 4 to 8 carbon atoms. This amino alcohol can be represented by the formula:

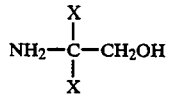
I wherein X is an alkyl or hydroxyalkyl group with the alkyl groups having from 1 to 3 carbon atoms wherein at least one, and preferably both, of the X substitutents is a hydroxyalkyl group of the structure —$CH_2)_nOH$, n being 1 to 3, Examples of such amino alcohols include: 2-amino-2-methyl-1,3-propanediol; 2-amino-2-ethyl-1,3-propanediol; and 2-amino-2-(hydroxymethyl)-1,3-propanediol, the latter also being known as THAM, or tris (hydroxymethyl) amino methane. THAM is particularly preferred because of its effectiveness, availability and low cost. The oxazolines, e.g., the bis-oxazolines (which are preferred) can be prepared in good yields by reaction of about two moles of the amino alcohol with one mole of the dicarboxylic acid material at 140° C. to 220° C., while removing three moles of water. A corresponding one to one mole ratio will give the monooxazoline.

The preparation of the bis-oxazolines can be illustrated schematically by the reaction between polyisobutylene succinic anhydride and THAM as follows:

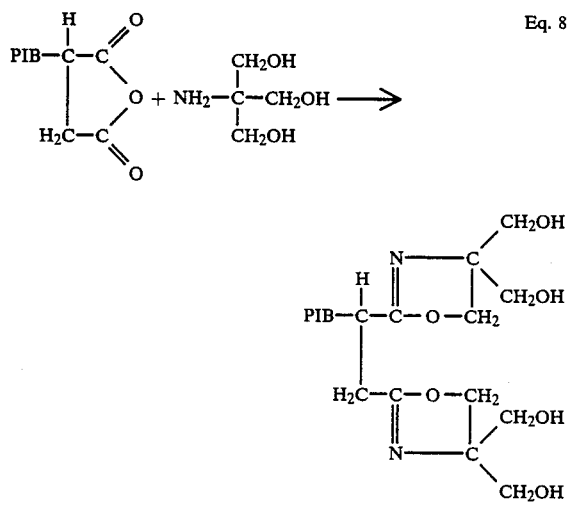
Eq. 8 where PIB is polyisobutylene.

Where it is desired to form a lactone oxazoline intermediate, the hydrocarbyl substituted dicarboxylic acid material is first lactonized and then reacted with the amino alcohol. As discused in U.S. Pat. No. 4,062,786, which patent has been incorporated herein by reference, the lactonization involves an intramolecular cyclization of an alkenyl dicarboxylic acid analog, the latter being derived from the ring scission of an amine as shown below wherein HQ represents water, an alcohol containing from 1 to 10 carbons, and dialkyl amines containing from 2 to 10 carbons and PIB is as previously defined.

The reaction with HQ is assumed to open the anydride at the least congested carbonyl group and form a succinic acid hemi-ester product.

In the presence of an acid catalyst, the hemi-ester cyclizes mostly to the 5-ring lactone product as shown below:

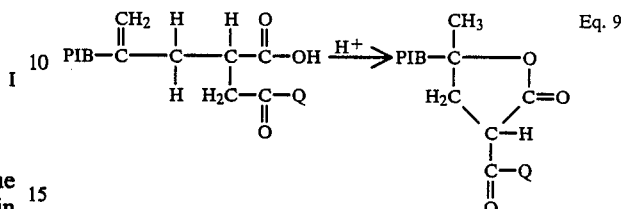
Eq. 9

The cyclized lactone may then be reacted with THAM to form a lactone oxazoline product as shown below:

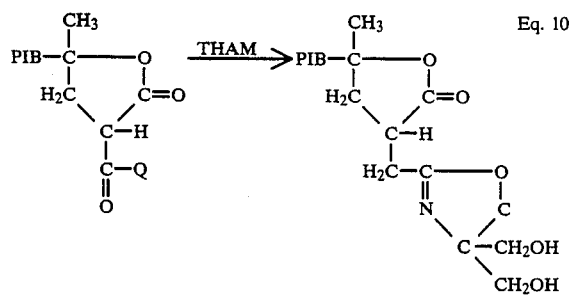
Eq. 10

It is possible to use alkenyl substituents with the double bond in the 1,2, or 3-position, or even double bonds further out on the hydrocarbyl chain, since the acid catalyst is capable of moving it into a position suitable for lactone formation. In general, the size of the lactone ring formed will depend upon, inter alia, the position of the double bond, and which carboxylic acid group participates in the lactone forming reaction. As a consequence, both 5- and 6- ring (or larger ring) lactones can be envisaged. For convenience, the products of the present invention are usually shown as 5-ring lactones although larger ring lactone products can also be present.

The intramolecular cyclization step involved in the above process must be carried out in the presence of an acid type catalyst in order to effect formation of the lactone. Suitable catalysts include the mineral acids, such as hydrochloric acid, sulfuric acid, perchloric acid, and phosphoric acid; the sulfonic acids such as the alkane-sulfonic acids and the arylsulfonic acids; the Lewis type acids such as aluminum chloride, boron trifluoride, antimony trichloride, and titanium tetrachloride; and low molecular weight sulfonic acid type ion exchange resin materials, such as cross-linked sulfonated polystyrene which is commercially available as Dowex-50. The amount of catalyst present in the reaction zone can be varied over wide limits depending upon the nature of the reactants and the catalyst used. The amount of catalyst used is also determined to a considerable extent by the temperature selected for conducting the reaction. Thus, at higher temperatures the amount of catalyst required in the reaction is less than when lower temperatures are used and the use of excessive amounts of catalyst at the more elevated temperatures will promote the formation of undesired side products. Ordinarily, the amount of catalyst used will be between about 0.1% and about 10% by weight of the amount of hydrocarbyl substituted dicarboxylic anhydride reactant.

LACTONE POLYMER CAPPING

In one aspect of the invention, the novel poly ($C_5$–$C_9$ lactone) adducts are prepared by reacting, e.g., polymerizing the $C_5$–$C_9$ lactone using the hydroxyl functionality of the intermediates formed by reacting the hydrocarbyl substituted dicarboxylic acid material with the polyol or amino alcohol as the ring opening and polymerization initiator.

Useful lactone compounds for this process include lactones having at least five carbon atoms in the lactone ring, e.g., 5 to 9 carbon atoms. The lactones may be substituted or unsubstituted and the substituents, if any, may comprise, for example, alkyl, aryl, aralkyl, cycloalkyl, alkoxy or other groups which would not interfere with the ring opening reaction and adduct formation. The preferred lactones have no more than two sustitutent groups, and the more preferred lactones are unsubstituted.

Non-limiting examples of the useful lactones include delta-valerolactone, methyl-delta-valerolactone, E-caprolactone, methyl-E-caprolactone, dihexyl-E-caprolactone, methyl-caprolactone, and the like, with E-carpolactone being particularly preferred.

The ring opening polymerization of the lactone by reaction with the hydrocarbyl substituted dicarboxylic acid intermediate material may be carried out, with or with out a catalyst, simply by heating a mixture of the lactone and dicarboxylic acid material in a reaction vessel in the absence of a solvent at a temperature of about 50° C. to about 200° C., more preferably to a temperature of about 75° C. to about 180° C., and most preferably at about 90° C. to about 160° C., for a sufficient period of time to effect polymerization. Optionally, a solvent for the monomer and/or polymer can be employed to control viscosity and or reaction rates.

In one preferred emodiment of the invention the $C_5$–$C_9$ lactone is reacted with a polyisobutenyl succinic acid ester which has been prepared by reacting polyisobutenyl succinic anhydride with pentaerythritol as outlined above. This reaction can be depicted generally be the equation:

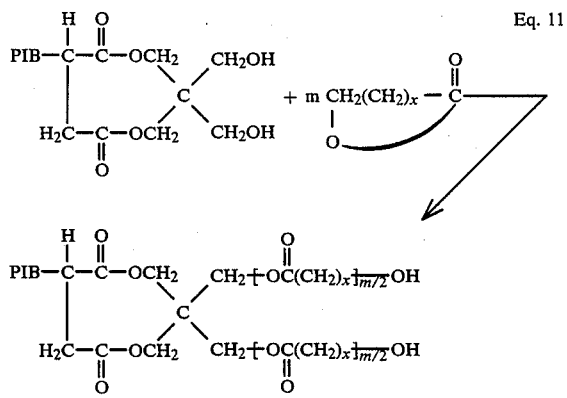

Eq. 11 where PIB is polyisobutylene; x is from 4 to 8, preferably x is 5; and the average value of about m is from about 0.2 to about 100, more preferably from 0.2 to about 50, and most preferably from 0.5 to about 20. It will be appreciated that the half ester also may be formed, and that in most cases, the reaction product will comprise a mixture of the half ester and diester.

In another preferred aspect, the bisoxazoline intermediate, formed by the reaction of polyisobutenyl succinic anhydride with THAM, is reacted with a $C_5$–$C_9$ lactone preferably E-caprolactone; and in still another preferred embodiment, the $C_5$–$C_9$ lactone is reacted with a lactone oxazoline intermediate as described above. The use of polyisobutenyl succinic anhydride-oxazoline and lactone-oxazoline intermediates to form $C_5$–$C_9$ lactone adduct dispersants is of particular interest since it appears that the $C_5$–$C_9$ lactone adducts offer improved thermal stability over dispersants comprising the unmodified oxazoline and lactone-oxazoline structures. Another advantage of using $C_5$–$C_9$ lactone to form adduct dispersants is that adducts offer increased polarity, and therefore, increased dispersant activity, without reducing the number of hydroxyl groups in the final dispersant products.

Catalysts useful in the promotion of the above identified reactions are selected form the group consisting of stannous octanoate, stannous haxanoate, stannous oxalate, tetrabutyl titanate, a variety of metal organic based catalyst acid catalysts and amine catalysts, as described on page 266, and forward in a book chapter authored by R. D. Lundberg and E. F. Cox entitled, "Kinetics and Mechanisms of Polymerication: Ring Opening Polymerization"; edited by Frisch and Reegen, published by Marcel Dekker in 1969, where stannous octanoate is an especially preferred catalyst. The catalyst is added to the reaction mixture at a concentration level of about 50 to about 10,000 parts of catalyst per one million parts by weight of total reaction mixture.

In reactions discussed above, the degree of polymerization (DP) of the lactone monomer may vary depending upon the intended application. At DP's much greater than about 10, e.g., greater than about 50, the polylactone adducts can exhibit crystallinity; a characteristic which is undesirable in an oil soluble dispersant due to the consequent high viscosity, or even solid, oil products which can be obtained. However, at lower DP's oil soluble adducts posessing low viscosity and desireable sludge and varnish inhibition characteristics are obtainied. Accordingly, regardless of the identity of the lactones and ester, bis-oxazoline or lactone oxazoline intermediates, the average value of m (or the degree of polymerization (DP) should be between about 0.2 and about 100, more preferably between about 0.2 and 50, and most preferably between 0.5 and about 20.

Further aspects of the present invention reside in the formation of metal complexes and other post-treatment derivatives, e.g., borated derivatives, of the novel additives prepared in with this invention. Suitable metal complexes may be formed in accordance with known techniques of employing a reactive metal ion species during or after the formation of the present $C_5$–$C_9$ lactone derived dispersant materials. Complex-forming metal reactants include the nitrates, thiocyanates, halides, carboxylates, phosphates, thiophosphates, sulfates, and borates of transition metals such as iron, cobalt, nickel, copper, chromium, manganese, molybdenum, tungsten, ruthenium, palladium, platinum, cadmium, lead, silver, mercury, antimony and the like. Prior art disclosures of these complexing reactions may be found in U.S. Pat. Nos. 3,306,908 and Re. 26,433.

Post-treatment compositions include those prepared by reacting the novel additives of the present invention with one or more post-treating reagents, usually selected from the group consisting of boron oxide, boron oxide hydrate, boron halides, boron acids, boron esters, sulfur, sulfur chlorides, phosphorous sulfides and oxides, carboxylic acid or anhydride acylating agents, epoxides and episulfides and acrylonitriles. The reaction of such post-treating agents with the novel additives of this invention is carried out using procedures known in the art. For example, boration may be accomplished in accordance with the teachings of U.S. Pat. No. 3,254,025 by treating the $C_5$–$C_9$ lactone derived additive compound with a boron oxide, halide, ester or acid. Treatment may be carried out by adding about 1–3 wt. % of the boron compound, preferably boric acid, and heating and stirring the reaction mixture at about 135° C. to 165° C. for 1 to 5 hours followed by nitrogen stripping and filtration, if desired. Mineral oil or inert organic solvents facilitate the process.

THE COMPOSITIONS

The lactone derived additives of the present invention have been found to possess very good dispersant properties as measured herein in a wide variety of environments.

Accordingly, the lactone derived adducts are used by incorporation and dissolution into an oleaginous material such as fuels and lubricating oils.

When the dispersants of this invention are used in normally liquid petroleum fuels such as middle distillates boiling from about 150° to 800° F., including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, usually will be employed.

The lactone derived dispersants find their primary utility in lubricating oil compositions which employ a base oil in which the additives are dissolved or dispersed.

Such base oils may be natural or synthetic lthough the natural base oils will derive a greater benefit.

Thus, base oils suitable for use in preparing lubricating compositions of the present invention include those conventionally employed as crankcase lubricating oils for spark-ignited and compression-ignited internal combustion engines, such as automobile and truck engines, marine and railroad diesel engines, and the like. Advantageous results are also achieved by employing the dispersant additives of the present invention in base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additives of the present invention.

Thus, the additives of the present invention may be suitably incorporated into synthetic base oils such as alkyl esters of dicarboxylic acids, polyglycols and alcohols; polyalphaolefins, alkyl benzenes, organic esters of phosphoric acids, polysilicone oils, etc.

Natural base oils include mineral lubricating oils which may very widely as to their crude source, e.g., whether paraffinic, naphthenic, mixed, paraffinic-naphthenic, and the like; as well as to their formation, e.g., distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blends oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cs. at 100° C.

Thus, the lactone derived additives of the present invention can be employed in a lubricating oil composition which comprises lubricating oil, typically in a major amount, and the dispersant additive, typically in a minor amount, which is effective to impart enhanced dispersancy, relative to the absence of the additive. Additional conventional additives selected to meet the particular requirements of a selected type of lubricating oil composition can be included as desired.

The dispersants of this invention are oil-soluble, dissolvable in oil with the aid of a suitable solvent, or are stably dispersible materials. Oil-soluble, dissolvable, or stably dispersible, as that terminology is used herein, does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additive of typically from about 0.10 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures. Alternatively, the dispersant additives may be blended with a suitable oil-soluble solvent and base oil to form a concentrate, and then blending the concentrate with lubricating oil base stock to obtain the final formulation. Concentrates will typically contain from about 20 to about 60 wt. %, by weight dispersant additive, and typically from about 80 to about 20%, preferably from about 60 to about 20% by weight base oil, based on the concentrate weight.

The lubricating oil base stock for the dispersant additives of the present invention typically is adapted to perform a selected function by the incorporation of additives therein to form lubricating oil compositions (i.e., formulations).

Representative additives typically present in such formulations include viscosity modifiers, corrosion inhibitors, oxidation inhibitors, friction modifiers, other dispersants, anti-foaming agents, anti-wear agents, pour point depressants and the like.

Viscosity modifiers impart high and low temperature operability to the lubricating oil and permit it to remain shear stable at elevated temperatures and also exhibit acceptable viscosity or fluidity at low temperatures.

Viscosity modifiers are generally high molecular weight hydrocarbon polymers including polyesters. The viscosity modifiers may also be derivatized to include other properties or functions, such as the addition of dispersancy properties.

These oil soluble viscosity modifying polymers will generally have number average molecular weights of from $10^3$ to $10^6$, preferably $10^4$ to $10^6$, e.g., 20,000 to 250,000, as determined by gel permeation chromatography or membrane osmometry.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound, interpolymers of styrene and acrylic esters, and styrene/isoprene copolymers.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as terpene, a heavy petroleum fraction of a $C_2$ to $C_6$ olefin polymer such as polyisobutylene, with from 5 to 30 wt. % of a sulfide of phosphorus for ½ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, e.g., calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts; U.S. Pat. No. 3,778,375 which discloses reaction products of a phosphonate with an oleamide; U.S. Pat. No. 3,852,205 which discloses S-carboxyalkylene hydrocarbyl succinimide, S-carboxyalkylene hydrocarbyl succinamic acid and mixtures thereof; U.S. Pat. No. 3,879,306 which discloses N-(hydroxyalkyl)alkenyl succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alyenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853.

Dispersants maintain oil insolubles, resulting from oxidation during use, in suspension in the fluid thus preventing sludge flocculation and precipitation or deposition on metal parts. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typically of those additives which usefully optimize the low temperature fluidity of the fluid are $C_8$–$C_{18}$ dialkylfumarate vinyl acetate copolymers, polymethacrylates, and wax naphthalene. Foam control can be provided by an antifoamant of the polysiloxane type, e.g., silicone oil and polydimethyl siloxane.

Anti-wear agents, as their name implies, reduce wear of metal parts. Representatives of conventional anti-wear agents are zinc dialkyldithiophosphate and zinc diaryldithiosphate.

Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz, overbased) metal salts, such as highly basic alkaline earth metal sulfonates (especially Ca and Mg salts) are frequently used as detergents. Representative examples of such materials, and their methods of preparation, are found in co-pending Ser. No. 235,920, filed Aug. 23, 1988, which is a continuation of Ser. No. 32,066, filed March 27, 1987 (now abandoned), which, in turn, is a continuation of Ser. No. 754,001, filed July 11, 1985 (now abandoned), the disclosure of which is hereby incorporated by reference.

Some of these numerous additives can provide a multiplicity of effects, e.g., a dispersant-oxidation inhibitor. This approach is well known and need not be further elaborated herein.

Compositions, when containing these conventional additives are typically blended into the base oil in amounts which are effective to provide their normal attendant function. Representative effective amounts of such additives are illustrated as follows:

| Additive | Vol % | Wt % A.I. |
| --- | --- | --- |
| Viscosity Modifier | 0.1–4 | .01–4 |
| Corrosion Inhibitor | 0.01–1 | .01–1.5 |
| Oxidation inhibitor | 0.01–1 | .01–1.5 |
| Dispersant | 0.1–7 | 0.1–8 |
| Pour Point Depressant | 0.1–1 | .01–1.5 |
| Anti-Foaming Agents | 0.001–0.1 | .001–0.15 |
| Anti-Wear Agents | 0.001–1 | .001–1.5 |
| Friction Modifiers | 0.01–1 | .01–1.5 |
| Detergents/Rust Inhibitors | 0.01–2.5 | .01–3 |

| Additive | Vol % | Wt % A.I. |
|---|---|---|
| Mineral Oil Base | Balance | Balance |

When other additives are employed, it may be desirable, although not necessary, to prepare dditive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the dispersant of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts are parts by weight and all molecular weights are number average molecular weights unless otherwise noted, and which include preferred embodiments of the invention.

EXAMPLE 1

Preparation of polyisobutenyl Succinic AnhydridePentaerythritol Adduct

Part A

A polyisobutenyl succinic anhydride (PIBSA) having an SA:PIB ratio of 1.31 succinic anhydride (SA) moieties per polyisobutylene (PIB) molecule of about 1300 $M_n$ was prepared by heating a mixture of 100 parts of polyisobutylene with 13 parts of maleic anhydride to a temperature of about 220° C. When the temperature reached 120° C., chlorine addition was begun and 10.5 parts of chlorine at a constant rate was added to the hot mixture for about 5 hours. The reaction was then heat soaked at 220° C. for about 1.5 hours and then stripped with nitrogen for about 1 hour. The resulting polyisobutenyl succinic anhydride has as ASTM Saponification Number of 103 which calculates to a succinic anhydride (SA) to polyisobutylene (PIB) ratio of 1.31 based upon the starting PIB as follows:

SA:PIB ratio =

$$\frac{SAP \times M_n}{112200 - (96 \times SAP)} = \frac{103 \times 1300}{112200 - (96 \times 103)} = 1.31$$

The PIBSA product was 90 wt. % active ingredient (a.i.), the remainder being primarily unreacted PIB. The SA:PIB ratio of 1.31 is based upon the total PIB charged to the reactor as starting material, i.e., both the PIB which reacts and the PIB which remains unreacted.

Part B

The PIBSA of Part A was esterified as follows:

About 1087 grams (1.0 moles) of the PIBSA 149.6 grams of pentaerythritol (PE) and 1187 grams of S150N lubricating oil (solvent neutral oil having a viscosity of about 150 to SUS at 100° C.) were mixed in a reaction flask and heated to about 200°–210° C. while stirring under a nitrogen blanket. The reaction mixture was kept at this temperature until complete esterification was obtained (about 4–6 hours) The resulting oil solution of PIBSA-PE was filtered and collected, The PIBSA-PE was analyzed for a hydroxyl number of 45 mg. KOH/gram of sample.

Example 2

About 200 g (0.8 mole) of PIBSA-PE prepared in Example 1 were mixed with 4.6 grams (0.04 mole) of E-caprolactone (CL) and 0.1% of stannous octanoate. The mixture was heated slowly to 160° C. while stirring under a nitrogen blanket. The mixture was kept at 160° C. for three hours. At the end of the third hour the resulting product (PIBSA-PE-CL) was nitrogen stripped at 160° C. for ten minutes and collected. Infrared Analysis of the reaction mixture showed that the lactone was completely reacted within the first hour. The unfiltered product showed a hydroxyl number of 47.4 mg KOH per gram of sample.

EXAMPLES 3–8

Preparation of Polyisbutenyl Succinic Anhydride-Pentaerythritol-Caprolactone Adducts The procedure of Example 2 was followed, except the mole ratio of CL to PIBSA-PE was varied.

Samples of the PIBSA-PE of Example 1 (control) and the various PIBSA-PB-CL products were then subjected to a standard sludge inhibition bench test (SIB) and a standard varnish inhibition bench test (VIB).

The SIB and VIB tests forecast the performance of a lubricant in a gasoline engine. These tests are described below:

The SIB test employs a used crankcase mineral lubricating oil composition having an original viscosity of about 325 SUS at 37.8° C. that has been used in a taxicab that was driven generally for short trips only, thereby causing a buildup of a high concentration of sludge precursors. The oil used contains only a refined base mineral oil, a viscosity index improver, a pour point depressant and zinc dialkyldithiophosphate antiwear additives. The oil contains no sludge dispersants. Such oil is acquired by draining and refilling taxicab crankcases at about 1,000–2,000 mile intervals.

The SIB test is conducted in the following manner: The used crankcase oil is freed of sludge by centrifuging for one half hour at about 39,000 gravities (gs). The resulting clear bright red oil is then decanted from the insoluble sludge particles. However, the supernatant oil still contains oil-soluble sludge precursors which, under the conditions employed by this test, tend to form additional oil-insoluble deposites of sludge. The sludge inhibiting properties of the additives being tested are determined by adding to portions of the used oil 0.5 wt. % on an active basis, of the particular additive being tested. Ten grams of each one being tested is placed in a stainless steel centrifuge tube and is heated at 140° C. for 16 hours in the presence of air. Following the heating, the tube containing the oil being tested is cooled and then centrifuged for 30 minutes at about 39,000 gs. Any deposits of new sludge that form in this step are separated from the decanting supernatant oil and then carefully washed with 15 ml. of pentane to remove all remaining oils from the sludge. The weight in milligrams of the new solid sludge that forms in the test is determined by drying the residue and weighing it. The results are reported as milligrams of sludge per ten grams of oil thus measuring differences as small as one part per ten thousand. The less new sludge formed, the more effective is the additive as a dispersant. In other words, if the additive is effective, it will hold at least a portion of the new sludge that forms on heating and oxidation, stably suspended in the oil so that it does not precipitate during the centrifuging period.

In the VIB test, a test sample consisting of ten grams of lubricating oil containing 0.5 wt. %, on an active basis, of the additive being evaluated is used. The test oil is a commercial lubricating oil obtained from a taxi after about 2,000 miles of driving with said lubricating oil. Each sample is heat soaked overnight at about 140° C. and thereafter centrifuged to remove the sludge. The supernatant fluid of each sample is subjected to heat cycling from about 150° C. to room temperature over a period of 3.5 hours at a frequency of about two cycles per minute. During the heating phase, a gas containing a mixture of 0.7 volume percent SO$_2$, 1.4 volume percent NO and the balance air is bubbled through the test samples and during the cooling phase, water vapor was bubbled through the test samples. At the end of the test period, which testing cycle can be repeated as necessary to determine the inhibiting effect of any additive, the wall surfaces of the test flasks in which the samples are contained are visually evaluated as to the varnish inhibition. The amount of varnish deposited on the walls is rated at values of from one to eleven with the higher number being the greater amount of varnish. It has been found that this test forecasts the varnish results obtained as a consequence of carrying out the ASTM MS-VD engine tests which is described more fully in ASTM Document for Multigrade Test Sequence for Evaluating Automotive Engine Oil, Sequence VD, Part 3 of STP 315H.

Table I, which follows, summarizes the compositions tested and the test results:

TABLE I

| Example | SA:PIB[1] | Hydroxyl Number | PIB M$_n$[2] | SAP[3] | PE/PIBSA[4] | CL/PIBSA-PE[5] | SIB[6] | VIB[7] |
|---|---|---|---|---|---|---|---|---|
| 1 | 1.31 | 45 | 1300 | 103 | 1.1 | 0 | 2.03 | 3 |
| 2 | 1.31 | 47.4 | 1300 | 103 | 1.1 | 0.5:1 | 2.00 | 3 |
| 3 | 1.31 | 43.8 | 1300 | 103 | 1.1 | 1:1 | .84 | 3 |
| 4 | 1.31 | — | 1300 | 103 | 1.1 | 2:1 | 1.47 | 3 |
| 5 | 1.31 | 40.5 | 1300 | 103 | 1.1 | 3:1 | 1.23 | 3½ |
| 6 | 1.31 | — | 1300 | 103 | 1.1 | 4:1 | 1.87 | 3½ |
| 7 | 1.31 | — | 1300 | 103 | 1.1 | 6:1 | 1.16 | 3½ |
| 8 | 1.31 | — | 1300 | 103 | 1.1 | 10:1 | | |

[1] = ratio of succinic anhydride moieties (SA) per polyisobutylene (PIB) molecule
[2] = number average molecular weight of PIB molecule
[3] = ASTM saponification number
[4] = mole ratio of pentaerythritol (PE) moieties to polyisobutylene succinic anhydride (PIBSA) moieties
[5] = mole ratio of caprolactone (CL) moieties to PIBSA-PE moieties
[6] = sludge inhibition bench test rating in milligrams sludge per 10 milligrams oil
[7] = varnish inhibition bench test rating on basis of 1 toll; the higher the rating, the greater the amount of varnish deposited The data in Table I indicate that the PIBSA-PE-CL adducts of the present invention should perform at least as well as the known PIBSA-PE type dispersants. In fact, the SIB data suggest that the present PIBSA-PE-CL adducts are likely to outperform the known PIBSA-PE dispersants of corresponding, SA:PIB, PIB M$_n$ and PIBSA/PE values.

EXAMPLE 9

Preparation of Polyisobutylene Succinic Anhydride Bisoxazoline (PIBSA-BISOX)

About 1087 g (1.0 Mole) of the PIBSA employed in Example 1 were diluted with 1058 g solvent 150 neutral mineral oil and heated to 160° C. under a nitrogen blanket. Thereafter 242 g (2.0 mole) of THAM were added in portions over a period of one half hour. When the addition was completed, the reaction mixture was heated to 170°–175° C. and stirred while nitrogen sparging for 3 hours. The resulting 50% oil solution was filtered and collected. It analyzed for 1.01 wt % nitrogen.

Examples 10–12

The procedure of Example 2 was repeated, except that the PIBSA-BISOX of Example 9 was substituted for the PIBSA-PE of Example 1, and the mole ratio of caprolactone to PIBSA-BISOX was varied. Samples of the PIBSA-BISOX (Example 9) and the PIBSA-BISOX-CL adducts (Example 10–12) were then subjected to the SIB and VIB tests. Table II, which follows, summarizes the compositions tested and the test results.

TABLE II

| Example | SA:PIB | Hydroxyl Number | PIB M$_n$ | SAP | CL/PIBSA-BISOX[1] | wt. % N | SIB | VIB |
|---|---|---|---|---|---|---|---|---|
| 9 | 1.31 | 98.0 | 1300 | 103 | 0 | 1.01 | 3.59 | 3½ |
| 10 | 1.31 | 97.1 | 1300 | 103 | 1:1 | .99 | 3.39 | 3½ |
| 11 | 1.31 | 71.0 | 1300 | 103 | 2:1 | .92 | 5.57 | 4 |

TABLE II-continued

| Example | SA:PIB | Hydroxyl Number | PIB $M_n$ | SAP | CL/PIBSA-BISOX[1] | wt. % N | SIB | VIB |
|---|---|---|---|---|---|---|---|---|
| 12 | 1.31 | 65.2 | 1300 | 103 | 3:1 | 1.00 | 7.6 | 3½ |

[1] = mole rate of caprolactone (CL) to polyisobutylene succinic anhydride bisoxazoline The results of Table II indicate that the PIBSA-BISOX-CL adducts, at least at the lower CL/PIBSA-BISOX ratios, should perform well as a dispersant additive for crankcase lubricants. This is of especial interest since is has been found that the CL adducts offer improved thermal stability over the corresponding unmodified PIBSA-BISOX dispersant structures.

EXAMPLE 13

Preparation of Polyisobutylene Succinic Anhydridge Lactone Mono-Oxazoline (PIBSA-MONOX)

About 1402 g (1.0 mole) of a polyisobutenyl succinic anhydride (prepared via the "ene" reaction of maleic anhydride and PIB) having a SAP No. of 80 and 78% active ingredient was admixed with 18 g of water and 1 g of concentrated sulfuric acid. The mixture was heated at 130° C. for about 4 hours. Infrared analysis indicated that the anhydride was correctly and completely converted to the desired lactone acid as evidenced by the strong carboxyl absorption bands at 5.63 to 5.84 microns. The lactone acid was diluted with 888 g of solvent 150 neutral mineral oil and 121 g of THAM were added. The reaction mixture was heated to 170° C. and kept there for about 2 hours. The oil solution was filtered and collected. The infrared analysis of the product features prominent lactone carboxyl and oxazoline (C=N) absorption bands at 5.63 and 6.0 microns. It analyzed for 0.59% nitrogen.

Examples 14–16

The procedure of Example 2 was repeated, except that the PIBSA-Monox of Example 13 was substituted for the PIBSA-PE of Example 1, and the mole ratio of caprolactone to PIBSA-MONOX was varied. Samples of the PIBSA-MONOX (Example 13) and the PIBSA-MONOX-CL adducts (Example 14-16) were then subjected to the SIB and VIB tests. Table III, which follows, summarizes the compostions tested and the test results.

cantly more efficient dispersant additives than the corresponding unmodified known PIBSA-MONOX dispersants, particularly with increasing amounts of caprolactone addition.

Example 17

Effects of $M_n$

The procedure of Example 2 was repeated, except that the number average molecular weight of the PIB and the mole ratio of CL to PIBSA-PE was varied. Samples of the various PIBSA-PE-CL adducts and PIBSA-PE controls were then subjected to the SIB and VIB tests. The compositions tested and the results of the tests are shown in Table IV.

TABLE IV

| Example | PIB $M_n$ | SA:PIB | SAP | PIBSA:PE:CL[1] | HAZE | Viscosity[2] | SIB | VIB |
|---|---|---|---|---|---|---|---|---|
| 17 | 1300 | 1.14 | 90.4 | 1.0:1.0:0 | 22 | 593 | 1.48 | 2 |
| 18 | 1300 | 1.14 | 90.4 | 1.1:1.1:0.33 | 19 | 610 | 2.05 | 2 |
| 19 | 1700 | 1.12 | 69.3 | 1.0:1.0:0 | 35 | 1176 | 2.27 | 2 |
| 20 | 1700 | 1.12 | 69.3 | 1.0:1.0:0.33 | 32 | 1102 | 0.68 | 2 |
| 21 | 1900 | 1.06 | 59.5 | 1.0:1.0:0 | 29 | 1485 | 0.77 | 2 |
| 22 | 1900 | 1.06 | 59.5 | 1.0:1.0:0.33 | 20 | 1614 | 1.03 | 2 |
| 23 | 2250 | 1.10 | 52.2 | 1.0:1.0:0 | 32 | 1411 | 3.32 | 2 |
| 24 | 2250 | 1.10 | 52.2 | 1.0:1.0:0.33 | 36 | 1662 | 3.32 | 2 |

[1] = molar ratio of polyisobutylene succinic anhydride to pentaerythritol to caprolactone
[2] = centistokes at 100° C.

The data in Table IV shows that the SIB values for the PIBSA-PE-CL adducts of the invention are in some cases slightly higher than the values obtained for corresponding unmodified PIBSA-PE dispersants, and in other cases slightly lower. There does not appear to be any linear relationship between the SIB rating and either the PIB molecular weight or the amount of caprolactone added, although very good SIB ratings were noted for the PIBSA-PE-CL adducts having a PIB molecular weight 1700 and 1900. The VIB ratings were good in all cases, as were haze ratings. As would be expected, there was a general trend toward increased viscosity with an increase in the PIB molecular weight.

In all cases, the SIB and VIB values for the PIBSA-PE-CL samples forcasted that the adducts would perform efficiently as dispersant additives for lubricating oils.

Examples 25–28

Effects of Molar Ratio of Caprolactone to PIBSA

The procedure of Example 2 was repeated, except that the mole ratio of CL to PIBSA-PE was varied. In all cases, the PIB $M_n$ was 1,300. Samples of the various PIBSA-PE-CL adducts and PIBSA-PE controls were then subjected to the SIB and VIB tests. The composi-

TABLE III

| Example | SA:PIB | Hydroxyl Number | PIB $M_n$ | SAP | CL/PIBSA-MONOX[1] | wt. % N | SIB | VIB |
|---|---|---|---|---|---|---|---|---|
| 13 | 0.72 | 40.0 | 940 | 80 | 0 | .59 | 9.28 | 3½ |
| 14 | 0.72 | 42.0 | 940 | 80 | 1:1 | .58 | 6.53 | 4 |
| 15 | 0.72 | 40.3 | 940 | 80 | 2:1 | .58 | 6.84 | 3½ |
| 16 | 0.72 | 35.7 | 940 | 80 | 4:1 | .54 | 3.41 | 4¾ |

[1] = mole ratio of caprolactone (CL) to polyisobutylene succinic anhydride lactone mono-oxazoline (PIBSA-MONOX)

The data in Table III indicate that the caprolactone adducts of the present invention should provide signifitions tested and the results of the tests are shown in Table V.

TABLE V

| Example | PIB $M_n$ | SA:PIB | SAP | CL/PIBSA | HAZE | Viscosity | Hydroxyl Number | SIB | VIB |
|---|---|---|---|---|---|---|---|---|---|
| 25 | 1300 | 1.31 | 103 | 0 | 38 | 597 | 45 | 2.03 | 3 |
| 26 | 1300 | 1.31 | 103 | 1 | 15 | 750 | 44 | .84 | 3 |
| 27 | 1300 | 1.31 | 103 | 2 | 30 | 1302 | 42 | 1.47 | 3 |
| 28 | 1300 | 1.31 | 103 | 3 | 30 | 2220 | 41 | 1.23 | 3 ½ |

The data in Table V show that SIB values improve significantly when known PIBSA-PE dispersants are reacted with caprolactone. The haze values also improve slightly, whereas the VIB values remain essentially unchanged. The addition of caprolactone to the PIBSA-PE structure results in an increase in viscosity with increasing amounts of caprolactone addition. The data clearly forecasts superior lubricating oil dispersant qualities for the lactonecapped PIBSA-POLYOL adducts of this invention.

Examples 29–30

Engine Tests

A PIBSA-PE dispersant (Example 29) and a corresponding PIBSA-PE-CL adduct (Example 30) were prepared in accordance with the procedure of Examples 1 and 2, respectively, except that the $M_n$ of the polyisobutylene was 2,250. The dispersants were subjected to SIB and VIB tests. The results thereof being shown in Table VI.

TABLE VI

| Example | PIB $M_n$ | SA:PIB | SAP | PIBSA:PE:CL | % A.I.[1] | SIB | VIB | Viscosity |
|---|---|---|---|---|---|---|---|---|
| 29 | 2250 | 1.10 | 52.2 | 1.0:1.1:0.0 | 50 | 5.32 | 2–3 | 1707 |
| 30 | 2250 | 1.10 | 52.2 | 1.0:1.1:0.5 | 50 | 4.65 | 2–3 | 2070 |

[1] = wt. % active ingredient (PIBSA-PE or PIBSA-PE-CL)

Examples 31–32

Two lubricant formulations were prepared from the dispersants of Examples 29 and 30, respectively. The formulations contained 4.0 vol. % of the respective dispersant in a commercial grade 10W30 crankcase oil. Each lubricant formulation also contained a conventional hydrocarbon type viscosity index improver, a zinc dialkyl dithiophosphate, an overbased 400 TMN magnesium sulfonate, an anti-friction additive and an anit-foamant. Except for the identity of the dispersant, each lubricant formulation was identical. The lubricant formulations were then tested in a Caterpillar 1-H2 Test which was run for 120 hours rather than the full 480 hours as described in ASTM Document for Single Cylinder Engine Test for Evaluating the Performance of Crankcase Lubricants, Caterpillar 1-2H Test Method, Part 1, STP 509A. This test evaluates the ability of diesel lubricants to curtail accumulation of deposits on the piston when operating in high severity diesel engines.

The characteristics of the dispersants, the lubricating oil containing the dispersants, and the test results are shown in Table VII.

Those skilled in the art will recognize that engine test results are subject to experimental errors. However, the data shown in Table VII, particularly in view of the data shown in Tables I–VI, suggest that the addition of a caprolactone capped PIBSA-PE in accordance with this invention should result in improved properties when compared to the same lubricant containing an equal amount of a corresponding PIBSA-PE dispersant that was not capped with caprolactone.

As will be evident to those skilled in the art, various modifications on this invention can be made or followed, in light of the foregoing disclosure and illustrative examples, tables and discussion, without departing from the spirit and scope of the disclosure or from the scope of the invention as set forth in the following claims.

What is claimed is:

1. A poly ($C_5$–$C_9$ lactone) adduct material useful as an oil additive and formed by reacting at a temperature of from about 50° to about 200° C. a $C_5$–$C_9$ lactone (I) with the reaction product (II) of a hydrocarbyl substituted $C_4$–$C_{10}$ dicarboxylic acid producing material and a polyol selected from the group consisting of aliphatic polyhydric alcohols containing up to about 100 carbon atoms and about 2 to about 15 hydroxyl groups and 2,2-disubstituted-2-amino-1-alkanols having from two to three hydroxyl groups and containing a total of 4 to 8 carbons atoms, said reaction product (II) being prepared at a temperature of from about 100° to about 250° C. over a period of from about 1 to about 10 hours, said hydrocarbyl substituted acid producing material being formed by reacting an olefin polymer of a $C_2$–$C_{10}$ monoolefin having a number average molecular weight of about 300 to about 10,000 and a $C_4$–$C_{10}$ monounsaturated dicarboxylic acid material selected from the group consisting of acids, esters and anhydrides, wherein there are an average of from about 0.7 to about 2.0 moles of dicarboxylic acid producing material per mole of said olefin polymer used in the reaction, and said poly ($C_5$–$C_9$ lactone) adduct containing the unit

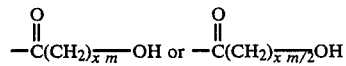

wherein m has an average value of from about 0.2 to

TABLE VII

| Example | Vol. % Dispersant | Grade | PIB $M_n$ | PIBSA:PE:CL | SAP | SA:PIB | WTD[1] | TGF[2] |
|---|---|---|---|---|---|---|---|---|
| 31 | 4.0 | 10W30 | 2250 | 1.0:1.1:0.0 | 52.2 | 1.10 | 224 | 58 |
| 32 | 4.0 | 10W30 | 2250 | 1.0:1.1:0.5 | 52.2 | 1.10 | 204 | 45 |

[1] = weighed total demerits
[2] top groove fill about 100 and x is a whole number from 4 to 8.

2. The poly($C_5$-$C_9$ lactone) adduct of claim 1, wherein said polyol is an aliphatic polyhydric alcohol.

3. The poly($C_5$-$C_9$ lactone) adduct material of claim 2, wherein said lactone is E-caprolactone.

4. The poly($C_5$-$C_9$ lactone) adduct of claim 3, wherein said $C_4$-$C_{10}$ monounsaturated dicarboxylic acid material is maleic anhydride.

5. The poly($C_5$-$C_9$ lactone) adduct of claim 4, wherein said olefin polymer is polyisobutylene.

6. The poly($C_5$-$C_9$ lactone) adduct material of claim 5, wherein said polyol is pentaerythritol.

7. The poly($C_5$-$C_9$ lactone) adduct of claim 6, wherein there are about 0.7 to 2.0 succinic anhydride units per polyisobutylene moiety present in said hydrocarbyl substituted $C_4$-$C_{10}$ dicarboxylic acid producing material, and wherein the number average molecular weight of said polyisobutylene is from 300 to about 10,000.

8. The poly($C_5$-$C_9$ lactone) adduct of claim 6, wherein there are about 0.7 to 1.6 succinic anhydride units per polyisobutylene moiety present in said hydrocarbyl substituted $C_4$-$C_{10}$ dicarboxylic acid producing material, and wherein the number average molecular weight of said polyisobutylene is from 300 to about 10,000.

9. The poly($C_5$-$C_9$ lactone) adduct of claim 8, wherein there are about 0.9 to 1.6 succinic anhydride units per polyisobutylene moiety present in said hydrocarbyl substituted $C_4$-$C_{10}$ dicarboxylic acid producing material, and wherein the number average molecular weight of said polyisobutylene is from 300 to about 10,000.

10. The poly($C_5$-$C_9$ lactone) adduct of claim 9, wherein there are about 1.05 to 1.35 succinic anhydride units per polyisobutylene moiety present in said hydrocarbyl substituted $C_4$-$C_{10}$ dicarboxylic acid producing material, and wherein the number average molecular weight of said polyisobutylene is from 300 to about 10,000.

11. The poly($C_5$-$C_9$ lactone) adduct of claim 6, wherein m has an average value of from about 0.5 to about 20.

12. The poly($C_5$-$C_9$ lactone) adduct of claim 1, wherein said polyol is a 2,2-disubstituted-2-amino-1-alkanol of the formula

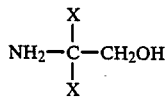

wherein X is an alkyl or hydroxyalkyl group with the alkyl groups having from 1 to 3 carbon atoms, wherein at least one of the X substituents is a hydroxyalkyl group of the formula $-(CH_2)_n OH$, and wherein n is 1 to 3.

13. The poly($C_5$-$C_9$ lactone) adduct of claim 12, wherein said polyol is tris(hydroxymethyl) amino methane.

14. The poly($C_5$-$C_9$ lactone) adduct of claim 13, wherein said hydrocarbyl substituted $C_4$-$C_{10}$ dicarboxylic acid producing material is first lactonized and then reacted with said tris(hydroxymethyl)amino methane to form a lactone-oxazoline intermediate, and wherein said intermediate is then reacted with said $C_5$-$C_9$ lactone.

15. The poly($C_5$-$C_9$ lactone) adduct of claim 14, wherein said $C_4$-$C_{10}$ monounsaturated dicarboxylic acid material is maleic anhydride, wherein said olefin polymer is polyisobutylene, and wherein said $C_5$-$C_9$ lactone is E-caprolactone.

16. The poly($C_5$-$C_9$ lactone) adduct of claim 13, wherein said reaction product of said hydrocarbyl substituted $C_4$-$C_{10}$ dicarboxylic acid producing material and said tris(hydroxymethyl)amino methane is a bis-oxazoline intermediate, and said bis-oxazoline intermediate being reacted with said $C_5$-$C_9$ lactone.

17. The poly($C_5$-$C_9$ lactone) adduct of claim 16, wherein said $C_4$-$C_{10}$ monounsaturated dicarboxylic acid material is maleic anhydride, wherein said olefin polymer is polyisobutylene, and wherein said $C_5$-$C_9$ lactone is E-caprolactone.

18. The poly($C_5$-$C_9$ lactone) adduct of claim 13, wherein there are about 0.7 to 2.0 succinic anhydride units per polyisobutylene moiety present in said hydrocarbyl substituted $C_4$-$C_{10}$ dicarboxylic acid producing material, and wherein the number average molecular weight of said polyisobutylene is from 300 to about 10,000.

19. The poly($C_5$-$C_9$ lactone) adduct of claim 13, wherein there are about 0.9 to 1.6 succinic anhydride units per polyisobutylene moiety present in said hydrocarbyl substituted $C_4$-$C_{10}$ dicarboxylic acid producing material, and wherein the number average molecular weight of said polyisobutylene is from 300 to about 10,000.

20. The poly($C_5$-$C_9$ lactone) adduct of claim 13, wherein there are about 1.05 to 1.35 succinic anhydride units per polyisobutylene moiety present in said hydrocarbyl substituted $C_4$-$C_{10}$ dicarboxylic acid producing material, and wherein the number average molecular weight of said polyisobutylene is from 300 to about 10,000.

21. The poly(C-$C_9$ lactone) adduct of claim 13, wherein there are about 1.05 to 1.35 succinic anhydride units per polyisobutylene moiety present in said hydrocarbyl substituted $C_4$-$C_{10}$ dicarboxylic acid producing material, and wherein the number average molecular weight of said polyisobutylene is from 300 to about 10,000.

22. The poly($C_5$-$C_9$ lactone) adduct of claim 15, wherein m has an average value of from about 0.5 to about 20.

23. The poly($C_5$-$C_9$ lactone) adduct of claim 17, wherein m has an average value of from about 0.5 to about 20.

24. The poly($C_5$-$C_9$ lactone) adduct of claim 11, wherein the number average molecular weight of said polyisobutylene is from 700 to about 3000.

25. The poly($C_5$-$C_9$ lactone) adduct of claim 22, wherein the number average molecular weight of said polyisobutylene is from 700 to about 3000.

26. The poly($C_5$-$C_9$ lactone) adduct of claim 23, wherein the number average molecular weight of said polyisobutylene is from 700 to about 3000.

27. An oil soluble dispersant useful as an oil additive, comprising the product of a reaction mixture comprising as reactants:
(I) the reaction product of (a) a hydrocarbyl substituted $C_4$-$C_{10}$ monounsaturated dicarboxylic acid producing material formed by reacting olefin polymer of $C_2$-$C_{10}$ monoolefin having a number average molecular weight of about 300 to 10,000 and a $C_4$-$C_{10}$ monounsaturated acid material selected from the group consisting of acids, esters and anhydrides, wherein there are from about 0.7 to about 2.0 molar equivalents of dicarboxylic acid producing moieties per molar equivalent of said olefin polymer in the reaction mixture, and (b) a polyol having up to about 100 carbon atoms and from about 2 to about 15 hydroxyl groups; and (II) a $C_5$–$C_9$ lactone, wherein there are, on the average, from about 0.2 to about 100 molar equivalents of $C_5$–$C_9$ lactone derived moieties per molar equivalent of said reaction product (I) used in the reaction, said reaction product (I) having been prepared by heating together reactants (a) and (b) at a temperature of from about 100° to about 250° C. for a period of from about 1 to about 10 hours, and said dispersant having been prepared by heating together reactants (I) and (II) at a temperature of from about 50° to about 200° C. for a period of time sufficient to effect ring opening polymerization of said $C_5$–$C_9$ lactone.

28. An oil soluble dispersant according to claim 27, wherein said $C_5$–$C_9$ lactone is caprolactone and said dispersant contains the unit

wherein m has an average value of from about 0.2 to about 50 and x is whole number of from 4 to 8.

29. An oil soluble dispersant according to claim 28, wherein said polyol is selected from the group consisting of aliphatic polyhydric alcohols having from about 2 to about 20 total carbon atoms and from 2 to about 15 hydroxyl groups and 2,2-disubstituted-2-amino-1-alkanols.

30. An oil soluble dispersant according to claim 29, wherein m has an average value of from about 0.5 to 20, and said polyol is pentaerythritol.

31. An oil soluble dispersant according to claim 29, wherein m has an average value of from about 0.5 to 20, and said polyol is tris(hydroxymethyl) amino methane.

32. An oil soluble dispersant according to claim 31, wherein said reaction product (I) is a bis-oxazoline.

33. An oil soluble dispersant according to claim 31, wherein said reaction product (I) is a lactone-oxazoline.

34. An oil soluble dispersant according to claim 29, wherein said $C_4$ to $C_{10}$ monounsaturated dicarboxylic acid material is maleic anhydride and said olefin polymer is polyisobutylene.

35. An oil soluble dispersant according to claim 34, wherein m has an average value of from about 0.5 to 20, and said polyol is pentaerythritol.

36. An oil soluble dispersant according to claim 34, wherein m has an average value of from about 0.5 to 20, and said polyol is tris(hydroxymethyl) amino methane.

37. An oil soluble reaction product useful as an oil additive, comprising.
(a) a polymer consisting essentially of $C_2$ to $C_{10}$ monoolefin, said polymer being of 300 to 10,000 number average molecular weight and being substituted with succinic moieties selected from the group consisting of acid, anhydride and ester groups, wherein there are from about 0.7 to about 2.0 molar proportions of said succinic moieties per molar proportion of said polymer, (b) a polyol selected from the group consisting of aliphatic polyhydric alcohols containing from about 2 to about 20 carbon atoms and from 2 to about 15 hydroxyl groups and 2,2-disubstituted-2-amino-1-alkanol of the formula

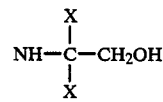

wherein X is an alkyl or hydroxyalkyl group with the alkyl groups having from 1 to 3 carbon atoms, wherein at least one of the X substituents is a hydroxyalkyl group of the formula—$(CH_2)_n OH$, and wherein n is 1 to 3 and containing 2 to 60 carbon atoms and 2 to 12 nitrogen groups, and (c) a $C_5$–$C_9$ lactone, wherein (a) is first reacted with (b) at a temperature of from about 100° to about 250° C. for a period of from about 1 to about 10 hours to form an intermediate reaction product which is then reacted with (c) at a temperature of from about 50° to about 200° C. for a period sufficient to effect ring opening polymerization of (c), and wherein there are an average of from about 0.2 to about 100 molar proportions of (c) per molar proportion of said oil soluble reaction product.

38. An oil soluble reaction product according to claim 37, wherein (b) is selected from pentaerythritol and tris(hydroxymethyl) amino methane.

39. An oil soluble reaction product according to claim 38, wherein said $C_5$–$C_9$ lactone is caprolactone.

40. An oil soluble reaction product according to claim 38, wherein (a) is polyisobutylene of about 700 to 3,000 number average molecular weight substituted with succinic anhydride moieties.

41. An oil soluble reaction product according to claim 40, wherein (c) is E-caprolactone and wherein there are an average of from 0.5 to 20 molar proportions of (c) per molar proportion of said reaction product.

42. An oil soluble reaction product according to claim 41, wherein (b) is pentaerythritol.

43. An oil soluble reaction product according to claim 41, wherein (b) is tris(hydroxymethyl) amino methane, and wherein (a) and (b) are reacted to form a bis-oxazoline intermediate which is then reacted with (c).

44. An oil soluble reaction product according to claim 41, wherein (b) is tris(hydroxymethyl) amino methane, and wherein (a) and (b) are reacted to form a lactone-oxazoline intermediate which is then reacted with (c).

* * * * *